Sept. 20, 1971 R. C. WEESE 3,605,674
UNDERWATER CABLE CONTROLLER
Filed Sept. 8, 1969 2 Sheets-Sheet 1
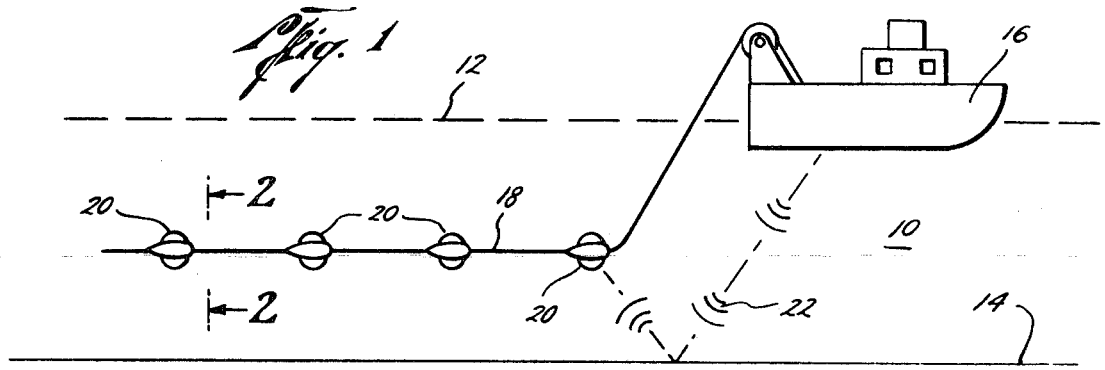
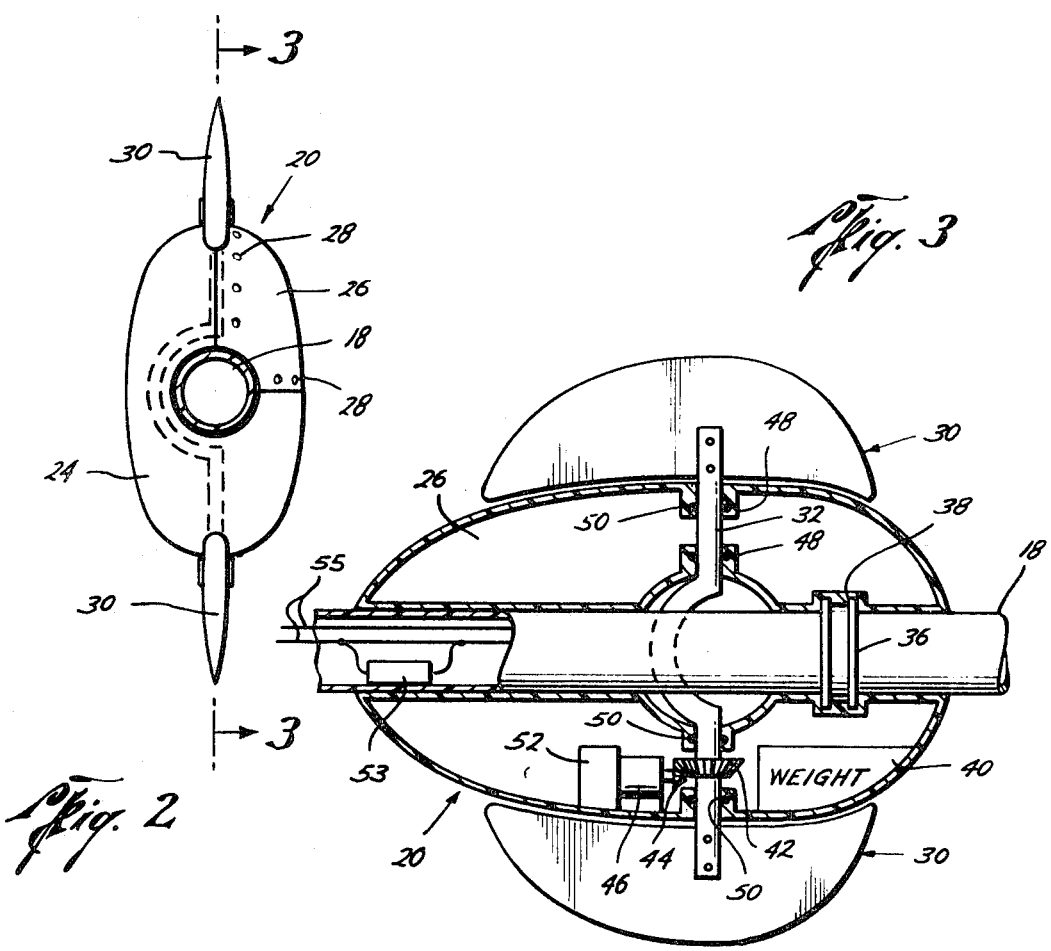
Raymond C. Weese
INVENTOR.
BY James F. Weiler
William A. Stout
Dudley R. Dobie, Jr.
Henry W. Hope
ATTORNEYS

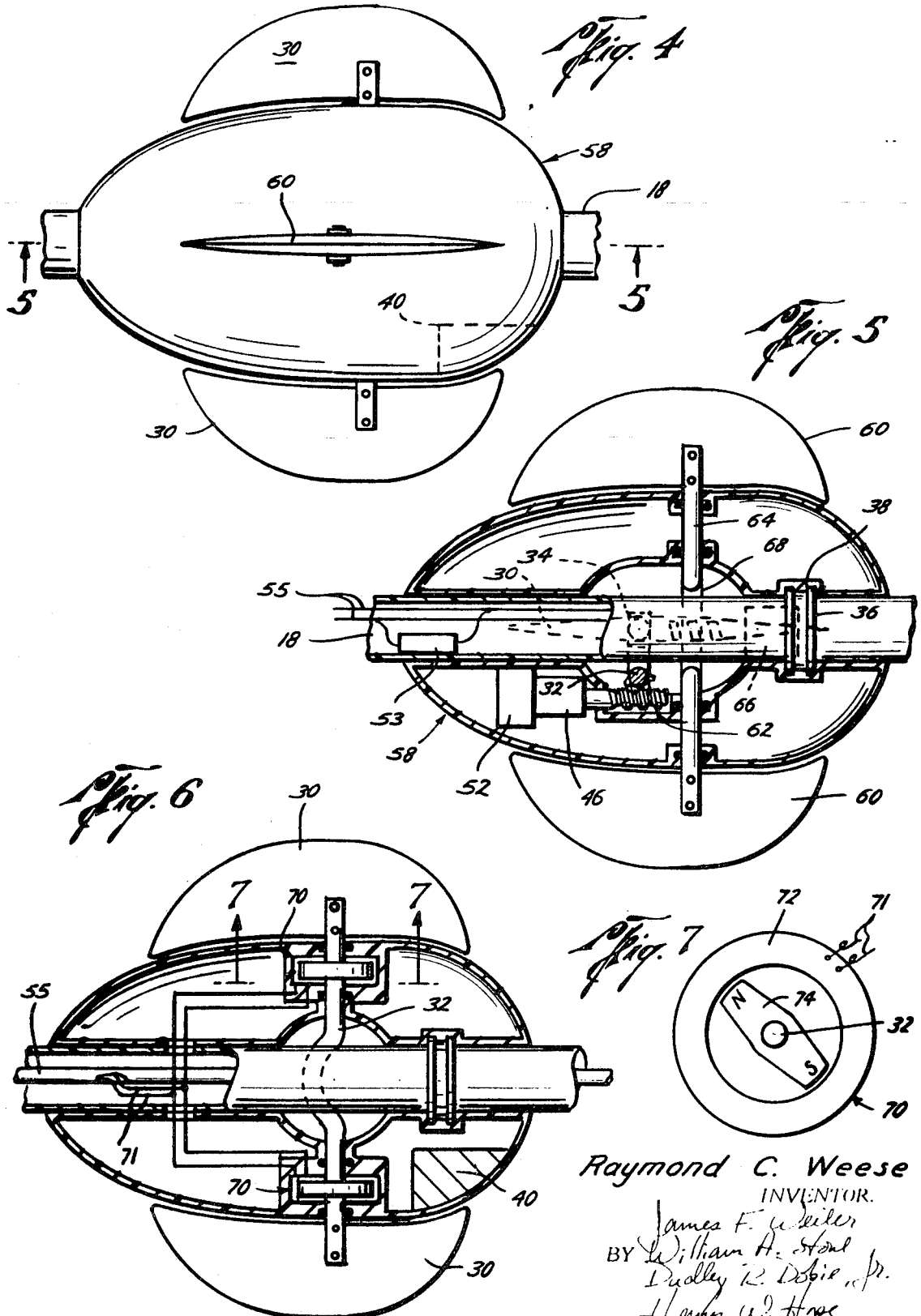

United States Patent Office 3,605,674
Patented Sept. 20, 1971

3,605,674
UNDERWATER CABLE CONTROLLER
Raymond C. Weese, Houston, Tex., assignor to
Dresser Industries, Inc., Dallas, Tex.
Filed Sept. 8, 1969, Ser. No. 855,939
Int. Cl. B63b 21/00
U.S. Cl. 114—235B                           9 Claims

ABSTRACT OF THE DISCLOSURE

The present invention is directed to controllers for use in connection with cables that are towed beneath a body of water in order to maintain the cable in a desired position. The controller employs control planes or vanes vertically disposed on opposite sides of the controller for maintaining position in a horizontal plane, and vanes horizontally disposed on opposite sides to maintain position in a vertical plane. Standard reversible D.C. motors or D.C. torque motors are used to control the position of the vanes in response to signals transmitted from the towing or other vessel. A yoke arrangement allows simultaneous operation of each pair of vanes.

BACKGROUND OF THE INVENTION

The orientation of objects towed below the surface of a body of water is today required in many areas dealing with the use, exploration and development of the earth's water bodies and the land areas lying beneath them. Perhaps the most common field requiring this is marine seismic exploration of geological formations in water covered areas. This technique encompasses the reflecting of seismic signals off of the subsurface layering down to depths of 5 or 6 miles and picking up these reflected signals by a seismic cable towed by a vessel. These cables are known in the field as "streamers," and are towed beneath the water's surface to avoid interference by waves with the cable's position or the configuraton that it assumes and to aid in receiving the reflected signals.

In order that the signals received can be properly and correctly interpreted, the position of the cable relative to the water surface, as well as to the bottom of the body of water must be known and maintained as uniformly as possible. The streamer, up to two miles in length, must also be maintained in a relatively straight-line horizontal position. Means are, therefore, required to resist action such as cross-currents which would disrupt the straight-line configuration of the cable. In addition, it is desirable to have means available to change the position of the cable to move it closer to or further away from the bottom or surface as conditions change.

In the past, various means have been devised to achieve the above results such as disclosed in the U.S. Patent Nos. 3,371,739, 3,331,050, 3,386,526 and 1,690,578. Such apparatus as disclosed in these patents, however, as well as other such devices, suffer from certain shortcomings which the present invention is designed to overcome.

Such prior devices are quite often controllers that are actuated by pressure sensitive and responsive means to maintain them at a preset and predetermined level below the surface of the water. This, of course, can be rather inconsistent and the pressure responsive means are often subject to malfunctions due to exposure to salt water and the like. Furthermore, these devices suffer from the obvious disadvantage of not being able to readjust the position of the cable once the controllers have been set and let out under tow. These controllers must, of course, be set for the depth desired before they are placed in the water. Thus no control is maintained over the controllers without reeling in the cable and resetting them should a change in position be desired, or should one of the controllers used become inaccurate for some reason, thereby resulting in a change of position of the cable or a portion thereof.

Other devices rely on relatively complex control apparatus to provide some control over the controllers once they are in position behind the towing vessel. These devices can often be unreliable, however, and are somewhat expensive due to the complex equipment involved. It should be remembered that usually a plurality of such underwater controllers are used on any such cable, and a malfunction in any one of these could result in an inaccurate and unreliable survey. Thus a dependable device is preferable and one that may be controlled from the ship so that adjustments can be made should the controller move out of position for some reason without the expensive and time-consuming method of reeling in the cable.

SUMMARY OF THE PRESENT INVENTION

The present invention seeks to overcome the above noted disadvantages by providing a relatively simple device which as a result gives extremely dependable performance. The controller which is the subject of the present invention utilizes a pair of vertically disposed vanes or rudder blades positioned on opposite sides of the controller body. These vertically disposed vanes are used to control the position of the controller in a horizontal plane, and a similar pair of horizontally disposed vanes are used to control the position of the controller in a vertical plane. It is, of course, anticipated that control in either the vertical or horizontal plane would not be desired in some situations, and accordingly, provision is made for the pairs of vanes to operate independently of each other. Furthermore, one pair of vanes may be omitted if necessary.

Simplified actuating means are employed to provide the movement of the vanes, and in turn, the control of the controllers and the attached cable. The actuating means is comprised of rotatably mounted yoke means extending between the vanes making up each pair, so that both vanes in each pair operate simultaneously. A reversible D.C. motor or D.C. torque motor is used to rotate the yoke means. This, in turn, rotates the vanes the desired amount. The motors are controlled by signals transmitted from the towing vessel, and being reversible, can actuate the vanes in either direction. Thus more than adequate control is provided for the controllers by this relatively inexpensive and simple arrangement of parts described herein.

It is, therefore, an object of the present invention to provide control means for the control and positioning of cable and the like while it is being towed beneath the surface of a body of water.

A still further object of the present invention is to provide such controllers which are comprised of relatively simple and economical arrangements of parts with the result of decreased costs and increased dependability.

It is the further object of the present invention to provide cable controllers which may be secured to the device to be controlled and which utilizes at least one pair of vanes connected by a yoke arrangement and rotatable in either direction.

Still another object of the present invention is to provide such a controller which utilizes two sets of vanes that are rotatable in either direction about axis perpendicular to each other, and which utilizes simplified control and actuating means for the positioning of the vanes.

Still another object of the present invention is to provide such apparatus which may be constructed in an inexpensive manner and which will provide long life, control means free from the elements within which it will be submersed and dependable performance with little maintenance time or cost involved.

Other and further objects, features and advantages will be apparent from the following description of a presently preferred embodiment of the invention, given for the purpose of disclosure when taken in conjunction with the accompanying drawings.

BRIEF DESCRIPTION OF THE DRAWINGS

Like character references designate like parts throughout the several views of the drawings, which views are as follows:

FIG. 1 is a partially schematic view of the present invention as it would be employed to control a cable being towed behind a vessel, FIG. 2 is a front view of one of the cable controllers as viewed along section lines 2—2 of FIG. 1 but on an enlarged scale, FIG. 3 is a section view of the controller of FIG. 2 as viewed along section lines 3—3 of FIG. 2, FIG. 4 is a side view of a second embodiment of the controller of the present invention, FIG. 5 is a section view of the second embodiment as seen along section lines 5—5 of FIG. 4, FIG. 6 is a section view of the first embodiment but showing different actuating means for the vanes, and FIG. 7 is an end view of one of the actuating means shown in FIG. 6 as seen along lines 7—7 of FIG. 6.

BRIEF DESCRIPTION OF THE PREFERRED EMBODIMENT

For purposes of description, the present invention will be described as used with a seismic cable. It should be understood, however, that the controller may be used for any such device that is to be towed beneath the surface of a body of water at a predetermined depth or over which control is desired. Other uses of the present invention would include such things as cables towing magnetometers, used to measure the earth's magnetic field, or cables towed by mine-sweepers.

Turning now to FIG. 1, there is shown a body of water generally indicated by the numeral 10 having a surface 12 and a bottom 14. A vessel 16 is illustrated as towing a cable 18. As can be seen, this cable is maintained beneath the surface of the water 12 but a certain distance above the bottom 14. The position of the cable relative to the water surface and to the bottom is usually determined by the use of a fathommeter to indicate the depth of the water and by the use of depth detectors carried in the cable to indicate the depth of the cable. This is accomplished by means of the cable controllers of the present invention, which controllers are generally indicated by the numeral 20. Also from the towing vessel 16, seismic waves 22 are directed toward the bottom 14 by which they are reflected back toward the seismic cable 18.

Turning now to FIGS. 2 and 3, a controller of the present invention is shown. The controller is made up of a body 24 having a removable section 26 to allow the body to be secured about the cable 18. The removable section 26 is secured to the remainder of the body by any suitable means such as screws 28. In the embodiment of FIGS. 2 and 3, only one pair of vanes 30 is utilized. Accordingly, this embodiment will allow control of the controller and connected cable only in a horizontal plane.

The vanes 30 are connected together by means of the yoke 32 which has a curved central section 34 to allow passage of the cable 18. A ring 36 is fixedly secured to the cable 18 and mates with a recess 38 in the body sections 24 and 26 to secure the cable controller 20 at a desired and fixed position on the cable. When the removable portion 26 is secured to the body, the recesses 38 are satisfactorily secured about the ring portion 36 to prevent the controller from slipping longitudinally on the cable. The cable controller can, however, rotate about the cable, and to maintain proper orientation of the controller relative to the water surface 12 and bottom 14, a weight 40 is secured at a suitable location in the body 24. This weight 40 will insure that the vanes 30, as well as the second pair of vanes in the embodiment disclosed in FIGS. 4 and 5, are maintained in the proper verticle and horizontal planes, so as to give full and accurate control over the controller.

A bevel gear 42 is connected to the yoke 34 and a second bevel gear 44 is connected to the shaft of a reversible D.C., stopper motor 46. This motor 46 is again secured to the body 24, and as one can readily tell, operation of the motor 46 will cause the gear 42 to rotate along with the yoke 34 to which gear 42 is fixedly secured. It should be noted that the yoke 34 is rotatably mounted in the body 24 and has suitable bearing members 48 for this purpose. These bearing members also contain sealing members 50 to prevent the flow of water into the body, thereby possibly damaging the actuating elements of the controller.

Fixedly secured to D.C. motor 46 is a receiver 52, which may also be secured to the body 24 if desired. The receiver 52 contains a power source for the motor such as a battery. The purpose of the receiver 52 is to receive signals transmitted from a transmitter 53 carried by the cable (a transmitter being positioned at each controller) to actuate the motor 46 accordingly. Appropriate wiring 55 leads through the cable to carry signals from the vessel to the transmitters 53. By proper signals, the motor 46 may be actuated in either direction, thereby rotating the vanes in either direction.

In operation, horizontal ranging sonar may be used on the towing vessels to monitor the cable and its position. This sonar can be viewed or photographed at will at the master console of the control equipment on the vessel, and thus, it provides a continuous monitor over the position of the cable. Other techniques may also be used to monitor the position of the cable. For example, a system marketed by Edo-Western of Salt Lake City, Utah, could be used. This system employs a number of transducers in the cable 18 which periodically transmit pulses through the water. Two additional cables are towed by the vessel 16, one on each side and each carrying receivers or hydraphones. Each pulse will be received by both hydraphones simultaneously if the cable is properly centered. If it is not, one hydraphone will receive the pulse first and the time lag between it and the second pulsing up of the pulse will determine how far out of position the cable is. In addition, these transducers will be positioned throughout the length of the cable so that the operators can determine what part of the cable is out of position. This can be accomplished, of course, by sending pulses at various times from the different transducers, sending different pulses from each, or by noting that the pulse from the first transducer will be received first, the second transducer's a short time later, and so on. It should perhaps be mentioned again that the position of the cable depthwise is determined by use of depth detectors in the cable and a fathommeter.

Should the cable for some reason move out of position, appropriate signals can be transmitted to the receiver 52 which will atctuate the motor 46 accordingly. The change in vane position is achieved, therefore, by supplying D.C. current in one direction or the other for a specific amount of time. A change in the direction of current flow will, of course, reverse the direction of rotation of the motor shaft and thereby, provide the means to rotate the vanes in either direction. Time of D.C. current flow is convertible into degrees of vane angle change and charts of such may be made up for ease of reference by the operator. Where a stopper motor is used, such as those manufactured by the Clifton Division of Litton Industries, each electrical signal or pulse transmitted to the receiver will result in the rotation of the motor shaft through a discrete increment, for example, twelve degrees (12°). With this knowledge and with knowledge of the gear ratio used, the amount of vane rotation for a pulse or a train of pulses can be determined. The change in position of the vanes will bring about the necessary adjustment to the path of travel of the controllers. Once the proper position has been resumed, the vanes can be again adjusted to the neutral position of FIG. 2 so that the cable will continue along in the path desired.

In the situation such as passing through an area of cross currents, the vanes can be rotated into the necessary position to maintain the cable on line with the desired path of travel through this area. Once the area of cross currents has been passed, the vanes are again returned to their neutral position shown in FIG. 2. All of the previously discussed adjustments can be made manually or with the provision of proper equipment, automatically.

As will be understood by those skilled in this art, the cable 18 will include weights (not shown) to provide a ballast effect, thus giving the cable a neutral balance at the desired depth, or as nearly as possible, thus, the cable will tend to sink to, and remain at, this depth. There are situations, however, in which it would be desirable to be able to adjust the depth of the controllers, or more accurately, adjust the distance between the controllers and cable and the bottom 14 of the body of water.

For this purpose, the controller 58 shown in FIGS. 4 and 5 may be used. Such controllers utilize two pairs of vanes, 30 and 60. Again the weight 40 is employed to insure that proper orientation of the controller 58 is maintained so that movement of the control vanes 30 and 60 will bring about the desired changes in direction or depth.

Turning now to FIG. 5, this section view discloses the internal arrangement of parts for the controller 58. The motor 46 is connected to the curved portion 34 of the yoke 32 by gearing indicated by the numeral 62. Certain advantages are derived from the utilization of the curved portion 34 of the yoke as the point at which the motor 46 is operatively geared thereto. By example only, greater leverage is obtained in rotating the vanes, thereby overcoming the resistance of the water to such movement with less stress or force exerted against the moving and controlling portions of the control apparatus. This is in view of the fact that the curved surface functions in effect as a lever arm for gearing 62 because of the position of the gearing relative to the point at which the yoke members are attached to the vanes.

A similarly shaped yoke 64 is utilized for the control vanes 60. Likewise, a similar arrangement is employed for the actuation thereof, which arrangement includes motor 66 shown in broken lines due to the fact that it is hidden in FIG. 5 by the cable 18. The motor 66 is operatively geared to the curved portion 68 of the yoke 64, as previously described with regard to yoke 32.

The operation of this last discussed embodiment is in effect the same as with the first discussed embodiment, with the exception that it provides means to control the position of the cable in both the vertical and horizontal planes. This gives even greater versatility to the present invention and to the operation being conducted. It should perhaps here be noted that a coded signal must be used for each controller, whereby each particular controller will be responsive to only its signal, so that individual control is provided. Where the embodiment of FIGS. 4 and 5 is used, a separate signal must also be used for each motor 46 in each controller.

The embodiment of FIG. 6 shows the controller of FIGS. 2 and 3 with different actuating means and signal sending means. The only differences shown between the embodiment of FIG. 6 and that of FIGS. 2 and 3 are the motors 70 used to control and move the yoke means 32 and the use of the wires 71 to actuate and control the motors. In this embodiment, a D.C. torque motor generally indicated by the numeral 70 is utilized. A satisfactory torque motor for this purpose is manufactured by the Torque Motor Products Division, Aeroflex Laboratories, Inc., of Plainview, N.Y. This motor 70 is shown in FIG. 7 in an enlarged view and is comprised generally of a toroidally distributed coil winding 72 and a permanent magnet 74. The yoke 32 passes through the center of the magnet and provides the axis about which it rotates. It is, of course, fixedly secured to the magnet so that as the magnet rotates, the yoke will also turn, thereby turning the vanes.

For carrying the central signals to the torque motor, as well as the electrical power to energize it, wires 71 lead directly to the motors 70 from the wires 55. Thus, the receiver and battery arrangement 52 and the transmitter 53 are eliminated. It is understood, of course, that the signal carrying and transmitting arrangements of FIGS. 3, 5 and 6 may be used interchangeably on any of the embodiments of the present invention.

In the embodiment of FIG. 6, a torque motor has been utilized on opposite ends of the yoke 32, but in many applications, only one such motor will be needed to rotate the yoke. Two are used simply to provide additional torque where necessary. These motors may, of course, be utilized on any embodiment of the present invention in lieu of the previously discussed arrangement made up of a D.C. motor geared to the yoke. The movement of the magnet (and attached yoke assembly) is a linear function directly proportional to the D.C. current flow. Thus by controlling current flow through the toroid coil, precise adjustments may be made to the vanes. These values can be calculated in advance and reduced to chart form to aid the operator. Again, a reversing of polarity will reverse the direction of rotation of the vanes.

This arrangement brings about obvious improvements in that no gearing is required, such gearing may fail for many reasons. Relatively fewer working parts are needed and direct control is maintained over the position of the yoke. The torque motors are extremely dependable and reliable for long performance. Again, appropriate seals are to be positioned at the various openings in the controller body so that water will not enter and have any deleterious effect on the control segments of the present invention.

As can be seen from the above, therefore, a controller has been disclosed which utilizes relatively simple components in its makeup, and due to this simplicity, provides for economy of manufacture and operation, as well as dependability and performance. A device is disclosed which may be remotely controlled to provide control movements or repositioning movements in both a vertical or horizontal plane. Individual control can be exercised over the individual controllers on any one cable. Means have also been included to insure proper orientation of the controller at all times and to prevent the controller from slipping along the length of the cable.

What is claimed is:

1. A controller for controling cable that is towed beneath the surface of a body of water comprising
   a body having a longitudinal axis for attachment about the cable,
   means for maintaining proper orientation of the controller,
   first yoke means rotatably secured to the body,
   a first pair of vanes fixedly secured to the first yoke means on opposite sides of the body for rotation with said first yoke means about a first axis which is generally perpendicular to said longitudinal axis,
   first actuating means for rotation of the first yoke means, said actuating means being reversible for rotation of the first yoke means in opposite directions of rotation,
   first control means for operating the first actuating means in response to signals remotely transmited to the first control means,
   second yoke means rotatably secured to the body, a second pair of vanes fixedly secured to the second yoke means on opopsite sides of the body for rotation with said second yoke means about a second axis which is generally perpendicular to said first axis and said longitudinal axis, second actuating means for rotation of the second yoke means, said actuating means being reversible for rotation of the second yoke means in opposite directions of rotation, and second control means for operating the second actuating means in response to signals remotely transmitted to the second control means.

2. The invention of claim 1 wherein the first and second actuating means are defined as, a reversible D.C. motor for each of said yoke means, the shaft of each said motor being operatively connected to its respective yoke means for rotation thereof.

3. The invention of claim 1 wherein the first and second actuating means are each defined as, at least one reversible D.C. torque motor for each first and second yoke means, the rotor of each D.C. torque motor being operatively connected to its respective yoke means for rotation thereof.

4. The invention of claim 2 wherein the first and second actuating means are each defined as including, a reversible D.C. torque motor mounted about each of said first and second yoke means, the rotor of each D.C. torque motor being secured to its respective yoke for rotation thereof.

5. The invention of claim 4 and including, two reversible D.C. torque motors for each of said yoke means, each of said yoke means having a curved section for passage of said cable through the body of the controller, the motors for each yoke means being positioned on opposite sides of its curved section.

6. The invention of claim 2 wherein, each yoke means has a curved section for passage of said cable through the body of the controller, said motors being operatively connected to the curved section of their respective yoke means.

7. The invention of claim 4 wherein each of said reversible D.C. torque motors are further defined as including, a toroidally distributed coil winding mounted about its respective yoke means, each said rotor being comprised of a permanent magnet rotatable about the respective axis of the yoke means to which it is secured, the yoke means to which it is secured being concentric with said respective axis at its connection with said rotor.

8. A controller for controlling cable that is towed beneath the surface of a body of water comprising, a body having a longitudinal axis for attachment about the cable, means for maintaining proper orientation of the controller, first yoke means rotatably secured to the body, a first pair of vanes fixedly secured to the first yoke means on opposite sides of the body for rotation with said first yoke means about a first axis which is generally perpendicular to said longitudinal axis, first actuating maens for rotation of the first yoke means, said actuating means being reversible for rotation of the first yoke means in opposite directions of rotation, first control means for operating the first actuating means in response to signals remotely transmitted to the first control means, said first actuating means being further defined as including reversible D.C. motor having a shaft operatively connected to the first yoke means for rotation thereof, and the first yoke means having a curved section for passage of said cable through the body of the controller, said motor shaft being operatively connected to said curved section.

9. A controller for controlling cable that is towed beneath the surface of a body of water comprising, a body having a longitudinal axis for attachment about the cable, means for maintaining proper orientation of the controller, first yoke means rotatably secured to the body, a first pair of vanes fixedly secured to the first yoke means on opposite sides of the body for rotation with said first yoke means about a first axis which is generally perpendicular to said longitudinal axis, first actuating means for rotation of the first yoke means, said actuating means being reversible for rotation of the first yoke means in opposite directions of rotation, and first control means for operating the first actuating means in response to signals remotely transmitted to the first control means, said reversible first actuating means being further defined as:

a reversible D.C. torque motor mounted about the first yoke, a rotor in said motor, rotatable about said first axis, said first yoke secured to the rotor at the point said first axis passes through the rotor for rotation therewith, said reversible D.C. torque being comprised of, a toroidally distributed coil winding mounted about the first yoke means, the rotor being comprised of a permanent magnet rotatable in said coil about said first axis, said first yoke means being concentric with said first axis at its connection with said rotor.

References Cited

UNITED STATES PATENTS

| | | | |
|---|---|---|---|
| 3,024,757 | 3/1962 | Aschinger | 114—235.2 |
| 3,375,800 | 4/1968 | Cole et al. | 114—235.2 |
| 3,412,704 | 11/1968 | Buller et al. | 114—235.2 |

TRYGVE M. BLIX, Primary Examiner

U.S. Cl. X.R.

81—0.5PCR